Feb. 26, 1963
L. G. HERRING
3,079,355
NITROPOLYURETHANE COMPOSITIONS
Filed Dec. 29, 1958
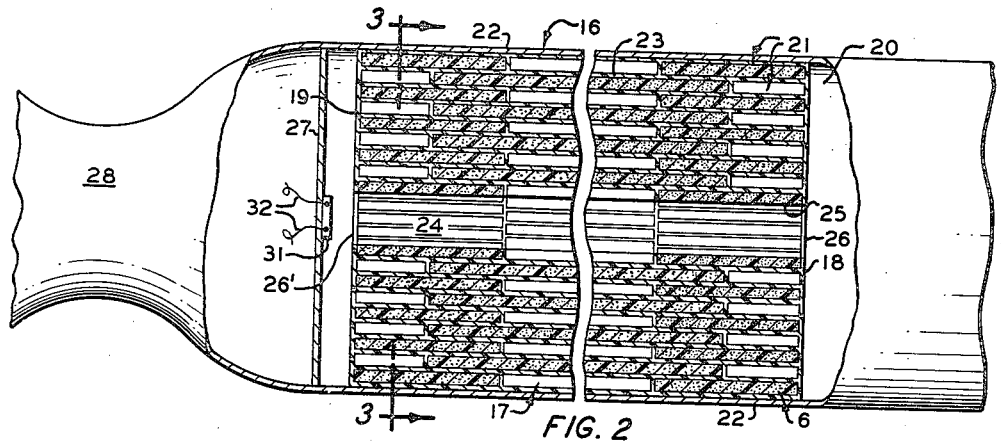
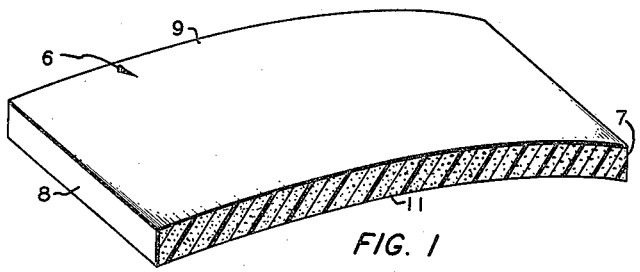
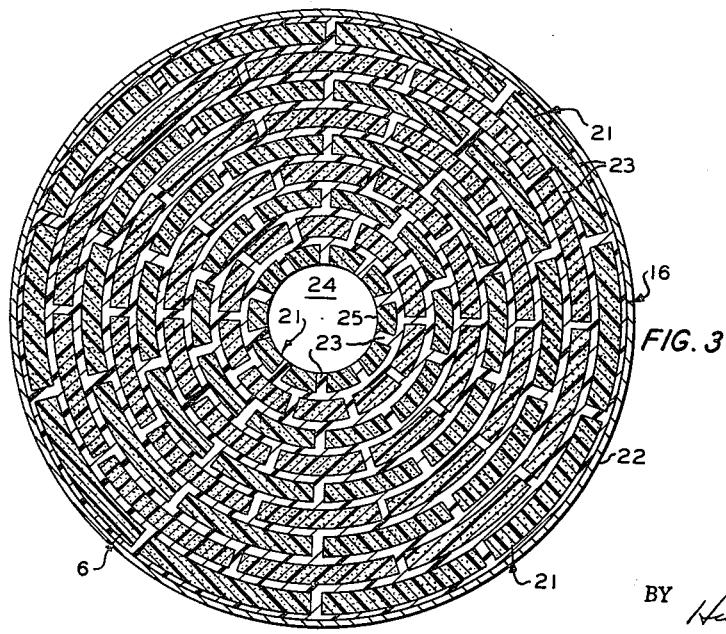
INVENTOR.
L.G. HERRING
BY *Hudson and Young*
ATTORNEYS

United States Patent Office 3,079,355
Patented Feb. 26, 1963

3,079,355
NITROPOLYURETHANE COMPOSITIONS
Liles G. Herring, McGregor, Tex., assignor to Phillips Petroleum Company, a corporation of Delaware
Filed Dec. 29, 1958, Ser. No. 783,618
8 Claims. (Cl. 260—18)

This invention relates to nitropolyurethane compositions. In one aspect, this invention relates to an adhesive or bonding agent for composite type propellants. In another aspect, this invention relates to a solid propellant charge built up from a plurality of small blocks or grains of propellant material of the composite type, said blocks being bonded together with the nitropolyurethane adhesive or bonding agent of the invention. In another aspect, this invention relates to the use of said nitropolyurethane compositions as the binder component in composite type propellants.

Rocket motors utilizing solid propellant may be classified in several categories depending on their size, shape and/or configuration of the charge, and on their utility (i.e., jet-assisted-take-off, booster, sustainer, or missile). Each classification has specific problems relating to its requirements and specifications. The present invention generally relates to those rocket motors utilizing large sustainer propellant charges having relatively long burning durations and capable of imparting high total impulses.

Rocket motors of the sustained-thrust type call for large sustainer propellant charges which involve scale-up problems of fabrication and assembly not found in the prior art. Since large sustainer propellant charges may weigh as much as 6,000 pounds or more, hazards in fabricating and handling such large masses of propellant material are encountered. It is generally not feasible to extrude or cast a single large grain of propellant material having such great weight.

It has recently been found that these large propellant charges can be made by building up a plurality of small blocks or grains of propellant to form a large propellant charge which for all intents and purposes acts as a single grain. Fabricating the large propellant charge in this manner permits a more thorough and rigid inspection of the propellant charge for cracks, fissures, or other imperfections. Moreover, building up large propellant charges in this manner enables the propellant fabricator to vary the burning rate and other performance characteristics of the charge by employing blocks of propellant having variable burning rates, shapes, and sizes.

Building up a large propellant charge from a plurality of small blocks of propellant requires the use of some type of bonding agent or adhesive for bonding together contiguous surfaces of the blocks of the propellant. This bonding agent must be combustible and have a sufficient high burning rate so that the burning or consumption of the propellant mass will proceed from one block of propellant to the next without slowing down or stopping when the progressively generated burning surface encounters the bonding agent. The usual rubber base cements are not applicable since their burning rates are so slow that they are practically non-combustible and may even cause cessation of combustion (a phenomenon known as "snuffing"). Moreover, the bonding agent must have a desirable degree of resiliency and be capable of withstanding forces of inertia, vibration, mechanical shock, and temperature-induced stresses and strains which tend to separate the blocks of propellant causing an undesirable exposure of burning surface area.

Polyurethanes have been proposed as adhesives or bonding agents for various materials. However, conventional polyurethanes are not applicable as adhesives or bonding agents for composite type propellants because of their low burning rate. I have found that the active hydrogen atom attached to the nitro-substituted compound takes part in the polyurethane reaction in the same manner that other active hydrogen containing compounds take part in said reaction and thus reacts with the isocyanate radicals in the isocyanate monomer and is reacted into the final composition. The nitro groups on the nitro-substituted compounds serve as a source of oxygen and nitrogen and thus increase the burning rate of the polyurethane composition and the nitropolyurethanes thus produced are more suitable adhesives. Said increase in the efficiency of the polyurethanes as adhesives is accomplished without any sacrifice in the usual adhesive properties of the polyurethane compositions.

Thus, broadly speaking, the present invention resides in a nitropolyurethane composition. As discussed further hereinafter, said nitropolyurethane composition is useful as an adhesive for bonding together blocks of composite type propellant material. Thus, the invention also provides a propellant charge comprising a plurality of small blocks or grains of propellant material of the composite type, which blocks are bonded together with the nitropolyurethane composition of the invention. The nitropolyurethane composition of the invention can also be used as the binder component in the preparation of castable propellant compositions of the composite type.

An object of this invention is to provide a new nitropolyurethane composition. Another object of this invention is to provide burnable adhesives or bonding agents, i.e., adhesives or bonding agents which will burn under the conditions existing in rocket motors. Another object of this invention is to prepare adhesives or bonding agents which when used to bond together blocks or grains of propellant material will have a shear strength approaching or exceeding the tensile strength of said propellant material. Another object of the invention is to provide a solid propellant charge built up from a plurality of blocks of propellant material, said blocks being bonded together with the nitropolyurethane composition of the invention. Still another object of the invention is to provide a solid propellant charge built up from a plurality of blocks or grains of propellant material bonded together with an adhesive or bonding agent such that the burning of the propellant material will proceed unimpeded from one block of propellant to the next block of propellant despite the bonding material disposed therebetween. Another object of the invention is to bond a plurality of blocks of propellant material together to form a single large propellant charge, the bond being capable of withstanding forces of inertia, vibration, mechanical shock, and temperature induced stresses and strains, which tend to cause separation of the blocks with a resultant increase in burning surface area. Other aspects, objects and advantages of the invention will be apparent to those skilled in the art in view of this disclosure.

The nitropolyurethane compositions of the invention can be prepared by the interaction of an organic polyisocyanate with (1) a triester of glycerol having a molecular weight within the range of 400 to 1550 and in which each ester group contains one hydroxyl group, (2) a second hydroxy compound having a chemical equivalent weight in the polyurethane reaction within the range of 30 to 1000, and (3) a nitro-substituted organic compound containing from 2 to 16 carbon atoms selected from the group consisting of 2,4,6,2',4',6'-hexanitrodiphenylmalonylurea and nitro-substituted organic compounds having the formula $R(NO_2)_n$ wherein R is selected from the group consisting of (a) An aromatic nucleus containing from 6 to 14 carbon atoms and having a substituent selected from the group consisting of

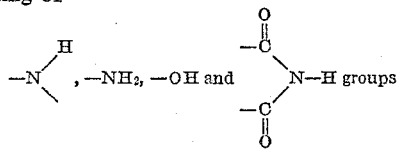

(b) A heterocyclic nucleus containing from 6 to 12 carbon atoms and having a secondary nitrogen atom in the ring structure forming said nucleus, and (c) A heterocyclic nucleus containing from 2 to 4 carbon atoms, from 0 to 2 oxygen atoms, and from 1 to 2 secondary nitrogen atoms in the ring, and wherein $n$ is an integer of from 1 to 6.

It is to be particularly noted that the nitro-substituted organic compound also contains at least one active hydrogen atom. Said active hydrogen atom takes part in the polyurethane reaction in the same manner as other active hydrogen atoms. That is, said active hydrogen atom will react with the isocyanate monomer used in preparaing the polyurethane and thus the nitro-substituted organic compound is reacted into and forms an integral part of the nitropolyurethane composition.

The actual composition in weight percent of the nitropolyurethane compositions of the invention will, of course, depend upon the specific ingredients used in preparing the composition; however, it will always be based on the chemical equivalents of isocyanate groups present in the composition. Table I given below sets forth a general formulation which can be used as a guide in preparing the nitropolyurethane compositions of the invention.

TABLE I

| Ingredients: | Chemical equivalents[1] |
|---|---|
| Polyisocyanate | 100 |
| Glycerol triester | 25–40 |
| Second hydroxy compound | 30–50 |
| Nitro substituted compound | 30–50 |

[1] To convert to parts by weight, multiply by the equivalent weights (molecular weight divided by the number of active hydrogen atoms or isocyanate groups in the molecule) of the individual compounds making up the composition. To convert parts by weight to weight percent divide the individual parts by weight by total parts by weight and multiply by 100. In event commercial compounds are used, it may be necessary to determine the equivalent weight experimentally. The hydroxyl number and base number can be utilized for glycerides, glycols, nitrohydroxy compounds and nitroimides.

While organic polyisocyanates in general can be used in the practice of the invention, the diisocyanates are usually preferred because of their availability and ease of preparation. Said polyisocyanates should be liquid under the conditions of use. Representative polyisocyanates which can be used in the practice of the invention, include, among others, those given in Table II below.

TABLE II

Toluene-2,4-diisocyanate
Toluene-2,3-diisocyanate
Commercial mixtures of 2,4- and 2,6-toluene diisocyanate
1,6-hexamethylene diisocyanate
Triphenylmethane triisocyanate
1,5-decamethylene diisocyanate
Cyclopentylene-1,3-diisocyanate
Cyclohexylene-1,3-diisocyanate
Diphenyl-4,4'-diisocyanate
Diphenyl-3,3'-diisocyanate
Toluene-2,5-diisocyanate
Benzene-1,3-diisocyanate
Benzene-1,4-diisocyanate
Benzene-1,2,4-triisocyanate
Toluene-2,4,6-triisocyanate
Benzene-1,3,5-triisocyanate
Benzene-1,2,3-triisocyanate
Toluene-2,3,4-triisocyanate In general, any active hydrogen containing compound which is known to react with polyisocyanates to form polyurethanes can be used in the practice of the invention. However, the triesters of glycerol in which each ester group contains one hydroxyl group and which have a molecular weight within the range of 400 to 1550 are the presently preferred active hydrogen atom containing compounds. Examples of said triesters of glycerol which can be used in the practice of the invention include, among others, those given in Tables IIIA and IIIB below.

TABLE IIIA

Castor oil
Glycerol esters of hydroxy acids such as:
 Epsilon-hydroxycaproic acid
 Zeta-hydroxyoenanthylic acid
 10-hydroxyundecylic acid
 13-hydroxybehenic acid
 3-hydroxypelarganic acid
 12-hydroxystearic acid

TABLE IIIB

Oxidation of linoleic acid with potassium permanganate forms several hydroxy stearic acids. Similarly, oxidation of the corresponding unsaturated fatty acids can be utilized to form Hydroxy-non-decylic acid
Hydroxy-arachidic acid
Hydroxy-carnaubic acid
Hydroxy-hyenic acid
Hydroxy-carboceric acid
Hydroxy-cerotic acid
Hydroxy-lacceroic acid
Hydroxy-melissic acid
Hydroxy-montanic acid
Hydroxy-myristic acid and
Hydroxy-psyllic acid which are suitable for esterifying glycol to form glycerides which are useful as substitutes for castor oil in the practice of the invention. While the hydroxy group may appear in any position in the alkyl chain to form usable compounds, it is generally preferred that the hydroxy group be introduced in the region of 8 to 20 carbon atoms from the carboxy group.

Examples of the second hydroxy compound which is used in the practice of the invention include, among others, those given in Table IV below.

TABLE IV

Triethylene glycol
Tetraethylene glycol
Methyl carbitol [1]
Ethyl carbitol [2]
Propyl carbitol [3]
n-Butyl carbitol [4]
Isobutyl carbitol [5]
Glycerol
Pentaerythritol
Dipropylene glycol
Tripropylene glycol
Polypropylene glycol
Flexricin–15 [6]

[1] Diethylene glycol monomethyl ether.
[2] Diethylene glycol monoethyl ether.
[3] Diethylene glycol monopropyl ether.
[4] Diethylene glycol monobutyl ether.
[5] Diethylene glycol monoisobutyl ether.
[6] 2-hydroxyethylricinoleate.

When the polyurethane compositions of the invention are used as the binder component in composite type propellants, as discussed hereinafter, it is preferred to use the higher molecular weight materials listed in the above Table IV.

Suitable nitro-substituted organic compounds for use in the practice of the invention are those containing at least one nitro group ($NO_2$) and at least one active hydrogen atom. Representative examples of said nitro-substituted organic compounds include, among others, those listed in Table V given below.

TABLE V 2,4,6-trinitrophenol (picric acid)
2,3,7,8-tetranitrocarbazole
2,3,7,8-tetranitrophenoxazine
2,5-dinitrophthalimide
2,4-trinitrophenylmalonylurea
2,6,7-trinitro-1,4-benzisoxazine
4,6,7-trinitro-1,2-benzisoxazine
3,4,6-trinitro-2-benzazole
3,4,6-trinitro-1-benzazole
4-nitro-1,2-diox-3-azole
2-nitro-1,3-diox-4-azole
2,4,6-trinitrophenylhydrazone
2,4,6,2',4',6'-hexanitro-diazoaminobenzene
2,6-dinitro-4-toluidine
2,4,6,2',4',6'-hexanitro-diphenylamine
2,3,4,6-tetranitroaniline
3,4-dinitropyrrol
4,5-dinitropyrazole
2,3,5-trinitrophthalimide
2,4,6,2',4',6'-hexanitro-diphenylmalonylurea In preparing the nitropolyurethane compositions of the invention, the reaction conditions are in general those known to persons skilled in the art for the preparation of conventional polyurethanes. A "prepolymer" is prepared by mixing the polyisocyanate compound with the two active hydrogen containing compounds, e.g., castor oil and a glycol, at room temperature. However, before the reaction between said monomers has proceeded to any substantial degree, a solution of the nitro-substituted organic compound in an organic polar solvent is added to said prepolymer. Definite control of the amount of said organic polar solvent used is not essential. Sufficient of said solvent is used to dissolve the nitro-substituted organic compound and hold same in solution until completion of the reaction between the monomers. When the nitropolyurethane composition is to be employed as an adhesive or bonding agent for bonding grains of propellant material together, the final reaction mixture containing the organic solvent is applied to the propellant surfaces to be bonded. Then, after the organic solvent has evaporated, the propellant blocks are pressed together to form the bond therebetween. When the nitropolyurethane composition of the invention is to be used as the binder component in a propellant composition, the solvent can be conveniently removed during the time that the oxidizer and other solid ingredients are being incorporated into the binder component as is discussed further hereinafter.

Suitable organic polar solvents which can be used to dissolve the nitro-substituted organic compound include, among others, acetone and methylethyl ketone.

As mentioned above, one of the principal uses of the nitropolyurethane compositions of the invention is as an adhesive or bonding agent for bonding blocks or grains of propellant material together to form large propellant charges for rocket motors. This aspect of the invention is illustrated in the following drawings in which:

FIGURE 1 is an isometric view of a typical block or grain of propellant;

FIGURE 2 is a longitudinal sectional view in elevation of a rocket motor of the sustainer-type loaded with a large, composite propellant charge, the individual blocks of which are bonded together according to the instant invention; and FIGURE 3 is a transverse sectional view in elevation of the rocket motor of FIGURE 2 taken along the plane 3—3.

Referring to the drawing now, and initially to FIGURE 1, a single grain or block of solid rocket propellant is shown generally designated 6. Block 6 is generally concavo-convex in cross section, having radial ends 7, 8, outer curved surface 9 and inner curved surface 11, the length of the inside arc of the latter surface being slightly shorter than the length of the outside arc of the former surface. Block 6 can vary in size and shape and can be fabricated by extrusion or any other suitable method.

In FIGURE 2, a rocket motor of the sustainer-type, generally designated 16, has a cylindrical casing or housing 22 defining a combustion chamber 20 in which is loaded a large, cylindrical propellant charge generally designated 17. The ends of charge 17 are covered with annular plates of restricting material 18, 19, which can be made from rubber or the like. Charge 17 comprises a plurality of concentric propellant strata 21, each of which comprise in turn a plurality of individual blocks or grains 6, such as that shown in FIGURE 1. The blocks 6 in each stratum are bonded together at their contiguous surfaces with the novel bonding agent 23 of this invention. Contiguous strata are also bonded together with this bonding agent 23 and the outermost stratum is preferably case-bonded with any suitable adhesive to the inner wall of the casing 22. Alternatively, the outer cylindrical surface of the outermost stratum can be bonded to suitable restricting material, such as rubber, with any suitable adhesive, and the restricting material bonded in turn to the casing 22 with a suitable adhesive. The innermost stratum of propellant has an exposed inner surface 25 which defines an axial perforation 24. Alternatively, the outer cylindrical surface of the outermost stratum can be exposed and annularly spaced from the inner wall of casing 22. Only nine cylindrical strata of propellant are shown in the drawing; however, it is to be understood that any number of strata can be employed, with varying dimensions.

Restricting plates 18, 19 are provided with axial openings 26, 26', respectively, which are substantially the same size as perforation 24. A suitable grid or spider 27 is positioned in the rocket motor casing 22 adjacent the nozzle portion 28 of the rocket motor 16. Nozzle portion 28 is constructed so as to define a converging-diverging passage for the exhaust of combustion gases at high velocity, and a separate nozzle portion may be substituted for the integral construction shown. A suitable blow-out disc is generally disposed in the nozzle exhaust section, in a manner well known in the art. Suitable ignition means such as an electrically actuated igniter 31 is secured to grid 27 in proximity to the end of the axial perforation 24. Electric wires 32 are in intimate contact with the igniter composition of igniting means 31 and extend from the rocket motor 16 through the nozzle passage to suitable contacts of a power source exterior to rocket motor 16.

In loading the rocket motor combustion chamber of FIGURE 2, the initial cylindrical stratum of blocks of propellant is preferably bonded to the casing of the rocket motor. Each succeeding cylindrical stratum is bonded to the previously loaded stratum in a similar manner using the bonding agent of this invention, and the blocks in each stratum are preferably staggered with respect to the blocks in the adjacent strata and with respect to adjacent blocks in the same stratum.

The bonding agent can be applied as a viscous liquid to the blocks of propellant material. After the organic solvent used to dissolve the nitro-substituted organic compound has evaporated, pressure is applied to form a bond between said blocks. After the charge is assembled, the whole is cured at elevated temperatures (e.g., 170 to 200° F.) while pressure is applied to the blocks of propellant to insure good contact of the bonding agent with the contiguous blocks of propellant.

Although this aspect of the invention has been described and illustrated as applied to a rocket motor loaded with a single charge, it is within the scope of the invention to provide a rocket motor loaded with a plurality of such charges, aligned, for example, in a tandem manner within the combustion chamber of said rocket motor. Also, it is not intended to limit the propellant charge configuration or the individual blocks or grains of propellant to those described or illustrated herein, and those skilled in the art will recognize that different shapes and sizes of blocks of propellant such as wedges, triangles, discs, etc., can be bonded together with the bonding agent of this invention to form charges having other configurations, e.g., module grains with star shaped perforations to obtain a relatively constant burning surface and uniform thrust.

The propellant charge illustrated in the drawing has an internal burning surface which can be adapted to progressively increase in area. Where a relatively constant burning surface area is desired, the charge can also have an external exposed cylindrical burning surface in addition to an internal burning surface defined by an axial perforation—this type of charge being annularly spaced in the rocket motor combustion chamber and supported by suitable spiders or the like.

In operation, the igniter is energized by the closing of a suitable switch, causing the ignition and resulting combustion of the igniter pyrotechnic material. The resulting igniter combustion products resulting from the firing of the igniter 31 fill the combustion chamber 20, preferably propagating down the length of the axial perforation 24, thereby contacting the exposed inner surface 25 of the innermost cylindrical stratum so as to ignite this surface. Subsequently, the propellant charge 17 begins to burn and generate gaseous combustion products which raise the temperature and pressure within the combustion chamber 17. When a predetermined pressure is reached in the combustion chamber 17, the blow-out disc functions, for example, by rupturing, and the generated gaseous products then flow through the nozzle passage, thereby imparting thrust to the rocket motor 16. The burning of the charge 17 takes place in relatively parallel layers, as is well known to those skilled in the art. As the progressively generated burning surface or advancing flame front encounters the layers of bonding material 23, between concentric strata 21 of propellant and between the contiguous blocks of propellant in each stratum, the bonding material itself burns at a relatively high rate which is comparable to that of the average burning rate of the charge 17, or for a more refined charge, at a rate comparable to that of the contiguous strata of propellant.

Since the bonding agent of this invention is combustible and has a desirably high burning rate, the charge can be consumed without intermittent interruptions or cessation in the burning process as the advancing burning surface or flame front encounters the bonding agent. As a result, the combustion chamber pressure will be maintained throughout the burning process. Moreover, since the bonding agent has a desirable degree of resiliency, the forces of inertia, vibration, mechanical shock, pressure, and temperature-induced stresses and strains will have lesser effect than otherwise on the mass of propellant.

The following example will serve to further illustrate the invention.

*Example I*

Three nitropolyurethane adhesive or bonding compositions, A, B, and C, having the compositions set forth in Table VI given below were prepared.

TABLE VI

| Ingredient | A | | B | | C | |
|---|---|---|---|---|---|---|
| | Chemical Equivalents | Weight percent | Chemical Equivalents | Weight percent | Chemical Equivalents | Weight percent |
| Hylene TM [1] | 100 | 24.21 | 100 | 20.92 | 100 | 25.59 |
| Castor Oil | 37.6 | 39.68 | 37.7 | 34.29 | 28.7 | 31.99 |
| Hexylene Glycol | 45.8 | 7.54 | 45.9 | 6.52 | 35.1 | 6.08 |
| Picric Acid | 46.8 | 28.57 | | | | |
| Tetranitrocarbazole | | | 46.0 | 38.27 | 35.2 | 35.70 |
| N-ethyl morpholine | | | | | ([2]) | 0.64 |

[1] An 80/20 mixture of the 2,4- and 2,6-isomers of toluene diisocyanate.
[2] This is added as a dispersing or solubilizing agent for the tetranitrocarbazole and does not enter directly into the polyurethane formulation.

In preparing the above compositions, A, B, and C, a prepolymer was formed in each instance by adding the diisocyanate to the castor oil and the glycol. Before the reaction had proceeded to any substantial degree, an acetone solution of the nitro compound was added to the prepolymer. The resulting mixture is then ready for use as an adhesive or bonding agent.

"Built up" propellant grains were prepared by cutting extruded five inch propellant grains of composite propellant material into discs approximately four inches thick. A first group of said discs was bonded together with adhesive A, a second group of said discs was bonded together with adhesive B, and a third group of said discs was bonded together with adhesive C to form three propellant charges. Each of the charges was then tested for bond strength. The results of these tests are given in Table VII below wherein the propellant charges are identified in accordance with the adhesive used in bonding each charge.

TABLE VII

| Shear Strength (p.s.i.) | A | B | C |
|---|---|---|---|
| Test 1 (bond No. 1) | 73 | 122 | 128 |
| Test 2 (bond No. 2) | 73 | 140 | 134 |
| Test 3 (bond No. 3) | | 124 | 154 |

The data given in Table VII show that the nitropolyurethane adhesives of the invention yielded bonds having a strength near the tensile strength of the propellant material used to formulate the charges. Thus, these data show that the nitropolyurethane adhesive is a satisfactory adhesive for bonding propellant blocks together to form large propellant charges.

Burning tests on propellant charges built up from blocks or grains of propellant material bonded together with the nitropolyurethane adhesives of the invention have shown that burning proceeds satisfactorily across the bonds between the propellant blocks.

The propellant composition utilized in preparing the built up propellant grains for the tests reported in the above Table VII is given below in Table VIII.

TABLE VIII

| Ingredient | Parts by Weight | Weight Percent |
|---|---|---|
| Bd/MVP Copolymer 90:10 | 10.31 | 9.67 |
| Philblack A (a furnace black) | 2.32 | 2.18 |
| ZP-211 [1] | 2.06 | 1.91 |
| Flexamine | 0.31 | 0.29 |
| Ammonium Nitrate | 85.00 | 79.85 |
| Milori Blue | 2.00 | 1.88 |
| Ammonium Dichromate | 4.00 | 3.75 |
| Magnesium Oxide | 0.50 | 0.47 |

[1] Di-(1,4,7-trioxaundecyl)methane.

While the above tests were carried out on propellant charges made from one specific propellant composition, it is to be understood that the invention is not so limited.

The nitropolyurethane adhesive compositions of the invention can be used to bond together blocks of any rubber based composite propellant known to the art. By a rubber based propellant, it is meant a composite propellant wherein a rubbery polymer comprises the binder component of said propellant. The term "rubbery polymer" as used herein and in the claims, unless otherwise specified, includes natural rubber and all rubbery polymers of olefins and diolefins which are prepared by either mass or emulsion polymerization. Some examples of suitable rubbery polymers are polybutadiene, polyisobutylene, polyisoprene, copolymers of isobutylene and isoprene, copolymers of conjugated dienes with comonomers such as styrene, and copolymers of conjugated dienes with polymerizable heterocyclic nitrogen bases. Said copolymers of conjugated dienes with polymerizable heterocyclic nitrogen bases comprise a preferred class of rubbery polymers for use in the binder component of many propellant compositions. A presently preferred rubbery copolymer is a copolymer of 1,3-butadiene with 2-methyl-5-vinylpyridine, referred to herein as Bd/MVP copolymer.

Said preferred class of rubbery polymers prepared by copolymerizing a conjugated diene with a heterocyclic nitrogen base can vary in consistency from very soft rubbers, i.e., materials which are soft at room temperature but which will show retraction when relaxed, to those having a Mooney value (ML–4) up to 100. The rubbery copolymers most frequently prepared have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 10 carbon atoms per molecule and include 1,3-butadiene, isoprene, 2-methyl-1,3-butadiene, and the like. Various alkoxy, such as methoxy and ethoxy, and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable. Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of said preferred polymeric materials are those of the pyridine, quinoline, and isoquinoline series which are copolymerizable with the conjugated diene and contain one, and only one,

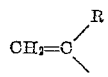

substituent wherein R is either hydrogen or a methyl group. That is, the substituent is either a vinyl or an alpha-methylvinyl (isopropanyl) group. Of these, the compounds of the pyridine series are of the greatest interest commercially at present. Various substituted derivatives are also applicable but the total number of carbon atoms in the groups attached to the carbon atoms by the heterocyclic nucleus should not be greater than 15 because the polymerization rate decreases somewhat with increasing size of the alkyl group.

A general formulation for rubber based propellant compositions to which the nitro polyurethane adhesive composition of the invention is applicable as an adhesive or bonding agent is as follows:

| Ingredient | Parts per 100 parts rubber | Parts by Weight |
| --- | --- | --- |
| Binder | | 10–50 |
| Rubber polymer | 100 | |
| Reinforcing agent | 10–30 | |
| Plasticizer | 10–30 | |
| Metal Oxide | 0–5 | |
| Silica | 0–20 | |
| Antioxidant | 0–5 | |
| Wetting agent | 0–2 | |
| Accelerator | 0–2 | |
| Sulfur | 0–2 | |
| Oxidizer | | 50–90 |
| Burning rate catalyst | | 0–10 |

Reinforcing agents which can be employed in such propellant compositions include carbon black, wood flour, lignin, and various other conventional reinforcing agents. Any suitable plasticizer, wetting agent, antioxidant, vulcanization accelerator, quaternizing agent, and metal oxide can be used in these propellant compositions. Examples of said materials are given hereinafter. Examples of the oxidizers and burning rate catalysts which can be used are also given hereinafter.

The nitro polyurethane compositions of the invention can also be used as the binder component in composite type propellants. When so used, said binder component comprises the nitropolyurethane compositions of the type hereinbefore described and, in addition, there may be present one or more plasticizers, wetting agents, antioxidants, and curing catalyst. The finished binder frequently contains various compounding ingredients. Thus, as in the binders of the previously described propellant compositions employing other rubbery polymers, it will be understood that herein and in the claims, unless otherwise specified, the term "binder" is employed generically and includes various conventional compounding ingredients. The binder content of the total propellant composition will usually range from 10 to 50 percent by weight.

In general, any rubber plasticizer which is compatible with the polyurethanes can be employed in these binder compositions. Materials such as dioctyl sebacate; di(1,4,7-trioxaundecyl)methane; di(3,6-dioxadecyl)formal (TP-90B); and dioctyl phthalate are suitable plasticizers. Materials which provide rubber having good low temperature properties are preferred.

Wetting agents aid in deflocculating or dispersing the oxidizer, Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants include Flexamine (physical mixture containing 65 percent of a complex diarylamine-ketone reaction product and 35 percent of N,N'-diphenyl-p-phenylenediamine), phenyl-beta-naphthylamine, 2,2-methylenebis(4-methyl-6-tert-butylphenol), and the like. Rubber antioxidants, in general, can be employed or if desired can be omitted.

While the propellant compositions of the invention will cure at ordinary room temperatures on standing, it is sometimes desirable to use curing catalysts and elevated temperatures so as to alter the curing time and the properties of the finished propellant. Suitable curing catalysts include among others, metal complexes such as Ferrocene (dicyclopentadienyl iron) or 2,4-pentanedione complexes with cobalt, chromium, nickel or iron. The amount of curing catalyst used will generally range from 0 to 1 weight percent based on the total propellant composition.

The curing temperature will be limited by the oxidant employed in some cases but will generally be in the range between 70 and 250° F., preferably between 140 and 200° F.

The curing time must be long enough to give required creep resistance and other mechanical properties in the propellant. The time will generally range from around two or three hours when the higher curing temperatures are employed to about seven days when curing is effected at lower temperatures.

Oxidants which are applicable in the solid propellant compositions of this invention are those oxygen-containing solids which readily give up oxygen and include, for example, ammonium, alkali metal, and alkaline earth metal salts of nitric, perchloric, and chloric acids, and mixtures thereof. Ammonium nitrate and ammonium perchlorate are the preferred oxidizers for use in the solid propellants of this invention. Other specific oxidizers include sodium nitrate, potassium perchlorate, lithium chlorate, calcium nitrate, barium perchlorate, and strontium chlorate. Mixtures of oxidizers are also applicable. In the preparation of the solid rocket propellant compositions, the oxidizers are ground to a particle size, preferably within the range between 2 and 300 microns average particle size. The most preferred particle size is from 10–220 microns. The amount of solid oxidizer used is usually a major amount of the total propellant composition and is generally in the range between 50 and 90 percent by weight of the total propellant composition. If desired, however, the oxidizer can comprise less than 50 percent by weight of the propellant composition, in some instances.

Burning rate catalysts applicable in the invention include ammonium dichromate, and metal ferrocyanides and ferricyanides. Ferric ferrocyanides, such as Prussian, Berlin, Hamburg, Chinese, Paris, and Milori blue, soluble ferric ferroxyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, is usually in the range of 0 to 10 weight percent based on the total propellant composition.

It is to be understood that each of the various types of compounding ingredients can be used singly, or mixtures of various ingredients performing a certain function can be employed. It is sometimes preferred, for example, to use mixtures of plasticizers rather than a single material.

A general formulation for a propellant composition prepared in accordance with the invention is as follows:

| | Weight percent |
|---|---|
| Binder | 10–50 |
|    Nitropolyurethane | 10–50 |
|    Plasticizer | 0–15 |
|    Antioxidant | 0–5 |
|    Surface active agent | 0–5 |
|    Curing catalyst | 0–1 |
| Oxidizer | 50–90 |
| Burning rate catalyst | 0–10 |

In mixing the castable propellant compositions of the invention, the nitropolyurethane composition is prepared as previously described. The resulting reaction mixture containing the organic solvent is then placed in any suitable type mixer, for example a Baker-Perkins mixture, and the other ingredients are then added. In mixing, the plasticizer and other binder ingredients are usually incorporated into the nitropolyurethane reaction mixture first. One procedure for completing the blending of the propellant ingredients utilizes a step-wise addition of the oxidizer component and the other dry ingredients to the previously formed binder mixture. Said dry-ingredients are divided into increments, usually four or more, and are incorporated into the binder mixture incrementally with thorough incorporation of each increment before addition of a succeeding increment. Upon completion of the mixing, the binder forms a continuous phase in the propellant with the oxidizer as the discontinuous phase.

Upon completion of the mixing, the finished propellant is poured into a mold for molding into finished propellant grains. If desired or necessary, the mold can be vibrated to insure proper flow and settling of the propellant composition within the mold.

As will be evident to those skilled in the art, various other modifications of the invention can be made, or followed, in view of the above disclosure, without departing from the spirit or scope of the invention.

I claim:

1. A nitropolyurethane composition of matter prepared by the interaction of 100 chemical equivalent weights of an organic polyisocyanate with (1) from 25 to 40 chemical equivalent weights of a triester of glycerol having a molecular weight within the range of 400 to 1550 and in which each ester group contains one hydroxyl group, (2) from 30 to 50 chemical equivalent weights of a second organic hydroxy compound having a chemical equivalent weight in the polyurethane reaction within the range of 30 to 1000, and (3) from 30 to 50 chemical equivalent weights of a nitro substituted organic compound having from 2 to 16 carbon atoms selected from the group consisting of 2,4,6,2',4',6'-hexanitrodiphenyl malonylurea and nitro substituted organic compounds having the formula $R(NO_2)_n$ wherein R is selected from the group consisting of (a) an aromatic nucleus having from 6 to 14 carbon atoms and having a substituent selected from the group consisting of

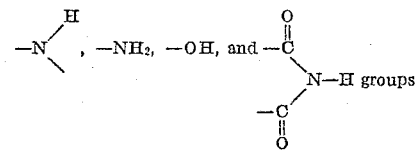

(b) a heterocyclic nucleus having from 6 to 12 carbon atoms and having a secondary nitrogen atom in the ring structure forming said nucleus, and (c) a heterocyclic nucleus having from 2 to 4 carbon atoms, from 0 to 2 oxygen atoms, and from 1 to 2 secondary nitrogen atoms in the ring, and wherein $n$ is an integer of from 1 to 6.

2. A composition according to claim 1 wherein said polyisocyanate is selected from the group consisting of toluene-2,4-diisocyanate, toluene-2,3-diisocyanate, commerical mixtures of 2,4- and 2,6-toluene diisocyanate, 1,6-hexamethylene diisocyanate, triphenylmethane triisocyanate, 1,5-decamethylene diisocyanate, cyclopentylene-1,3-diisocyanate, cyclohexylene-1,3-diisocyanate, diphenyl-4,4'-diisocyanate, diphenyl-3,3'-diisocyanate, toluene glycol monobutyl ether, diethylene glycol monoiso-1,3-diisocyanate, benzene-1,4-diisocyanate, benzene-1,2,4-triisocyanate, toluene-2,4,6-triisocyanate, benzene-1,3,5-triisocyanate, benzene-1,2,3-triisocyanate, and toluene-2,3,4-triisocyanate; said triester of glycerol is selected from the group consisting of castor oil, and glycerol esters of hydroxy acids selected from the group consisting of epsilon-hydroxycaproic acid, zeta-hydroxyoenanthylic acid, 10-hydroxyundecylic acid, 13-hydroxybehenic acid, 3-hydroxypelarganic acid, 12-hydroxystearic acid, hydroxy-non-decyclic acid, hydroxy-arachidic acid, hydroxy-carnaubic acid, hydroxy-hyenic acid, hydroxy-carboceric acid, hydroxy-cerotic acid, hydroxylacceroic acid, hydroxy-melissic acid, hydroxy-montanic acid, hydroxy-myristic acid, and hydroxy-psyllic acid; and said second organic hydroxy compound is selected from the group consisting of triethylene glycol, tetraethylene glycol, diethylene glycol monomethyl ether, diethylene glycol monoethyl ether, diethylene glycol monopropyl ether, diethylene glycol monobutyl ether, diethylene glycol monoisobutyl ether, glycerol, pentaerythritol, dipropylene glycol, tripropylene glycol, polypropylene glycol, and 2-hydroxyethylricinoleate.

3. A composition according to claim 1 wherein said polyisocyanate is a mixture of 2,4- and 2,6-tolylene diisocyanates, said triester of glycerol is castor oil, said second hydroxy compound is hexylene glycol, and said nitro substituted compound is 2,4,6-trinitrophenol.

4. A composition according to claim 1 wherein said polyisocyanate is a mixture of 2,4- and 2,6-tolylene diisocyanates, said triester of glycerol is castor oil, said second hydroxy compound is hexylene glycol, and said nitro substituted compound is 2,3,7,8-tetranitrocarbazole.

5. A composition according to claim 1 wherein said polyisocyanate is a mixture of 2,4- and 2,6-tolylene diisocyanates, said triester of glycerol is castor oil, said second hydroxy compound is a polypropylene glycol, and said nitro substituted compound is 2,4,6-trinitrophenol.

6. A composition according to claim 1 wherein said polyisocyanate is a mixture of 2,4- and 2,6-tolylene diisocyanates, said triester of glycerol is castor oil, said second hydroxy compound is a polypropylene glycol, and said nitro substituted compound is 2,3,7,8-tetranitrocarbazole.

7. A composition according to claim 1 wherein said polyisocyanate is a mixture of 2,4- and 2,6-tolylene diisocyanates, said triester of glycerol is castor oil, said second hydroxy compound is 2-hydroxyethylricinoleate, and said nitro substituted compound is 2,4,6-trinitrophenol.

8. A composition according to claim 1 wherein said polyisocyanate is a mixture of 2,4- and 2,6-tolylene diisocyanates, said triester of glycerol is castor oil, said second hydroxy compound is 2-hydroxyethylricinoleate, and said nitro substituted compound is 2,3,7,8-tetranitrocarbazole.

References Cited in the file of this patent

UNITED STATES PATENTS

| | | |
|---|---|---|
| 2,479,470 | Carr | Aug. 16, 1949 |
| 2,758,132 | Thomas | Aug. 7, 1956 |
| 2,816,910 | Junkmann et al. | Dec. 17, 1957 |
| 2,857,258 | Thomas | Oct. 21, 1958 |

UNITED STATES PATENT OFFICE
CERTIFICATE OF CORRECTION

Patent No. 3,079,355                                February 26, 1963

Liles G. Herring

It is hereby certified that error appears in the above numbered patent requiring correction and that the said Letters Patent should read as corrected below.

Column 12, lines 55 to 57, strike out "toluene glycol monobutyl ether, diethylene glycol monoiso-1,3-diisocyanate" and insert instead -- toluene-2,3-diisocyanate, toluene-2,5-diisocyanate, benzene-1,3-diisocyanate --.

Signed and sealed this 2nd day of June 1964.

(SEAL)
Attest:

ERNEST W. SWIDER
Attesting Officer

EDWARD J. BRENNER
Commissioner of Patents